United States Patent [19]

McClure

[11] Patent Number: 5,319,347

[45] Date of Patent: Jun. 7, 1994

[54] PARALLELIZED MAGNITUDE COMPARATOR FOR COMPARING A BINARY NUMBER TO A FIXED VALUE

[75] Inventor: David C. McClure, Carrollton, Tex.

[73] Assignee: SGS-Thomson Microelectronics, Inc., Carrollton, Tex.

[21] Appl. No.: 876,851

[22] Filed: Apr. 30, 1992

[51] Int. Cl.$^5$ ............................ G05B 1/03; G06F 7/02
[52] U.S. Cl. .................................. 340/146.2; 307/355
[58] Field of Search ...................... 307/355; 340/146.2

[56] References Cited

U.S. PATENT DOCUMENTS

| | | | |
|---|---|---|---|
| 3,938,087 | 2/1976 | Louie | 340/146.2 |
| 4,032,885 | 6/1977 | Roth | 340/146.2 |
| 4,584,556 | 4/1986 | Chan | 340/146.2 |
| 4,891,788 | 1/1990 | Kreifels | 365/189.01 |
| 4,935,719 | 6/1990 | McClure | 340/146.002 |
| 4,974,241 | 11/1990 | McClure . | |
| 5,130,692 | 7/1992 | Ando et al. | 340/146.2 |

FOREIGN PATENT DOCUMENTS 0098692  1/1984  European Pat. Off. .
2229084 12/1973  Fed. Rep. of Germany ... 340/146.2
1603654  5/1971  France .

OTHER PUBLICATIONS

Electronic Engineering, vol. 62, No. 760, pp. 27–28, Apr. 1990, London, GB.

Primary Examiner—John Zazworsky
Attorney, Agent, or Firm—Renee M. Larson; Lisa K. Jorgenson; Richard K. Robinson

[57] ABSTRACT

A magnitude comparator suitable for use in a FIFO memory is modified to compare the magnitudes between any binary number and a fixed value. Bit comparators are divided into groups which generate compare output signals in parallel to one another, thereby reducing total magnitude comparator delay and resulting in faster operation. These compare output signals are fed into a control element which determines which compare output signal is allowed to pass through as the final compare output signal.

25 Claims, 2 Drawing Sheets

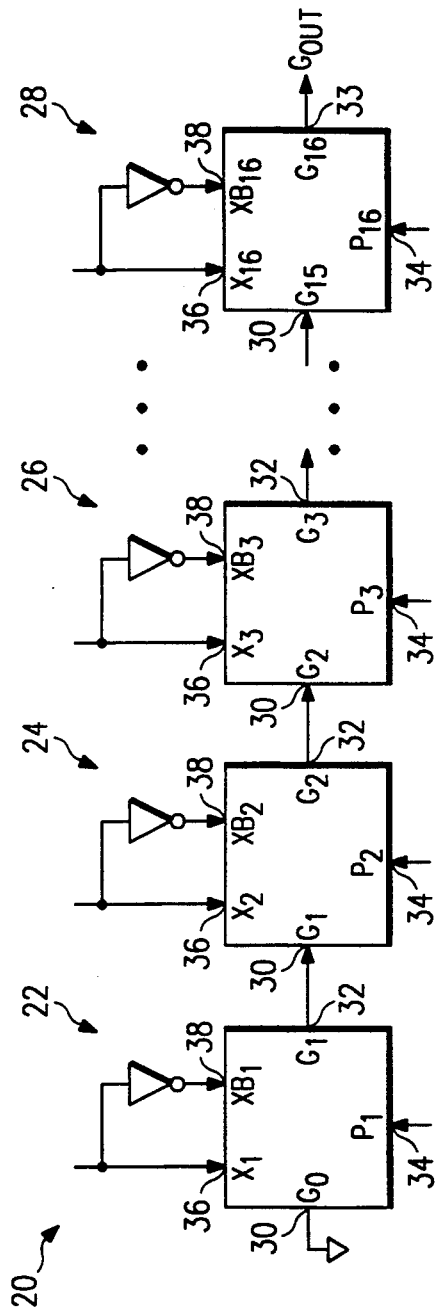
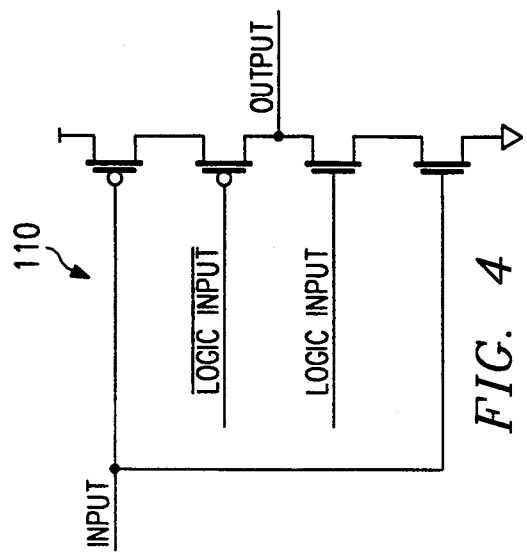
FIG. 1
(PRIOR ART)
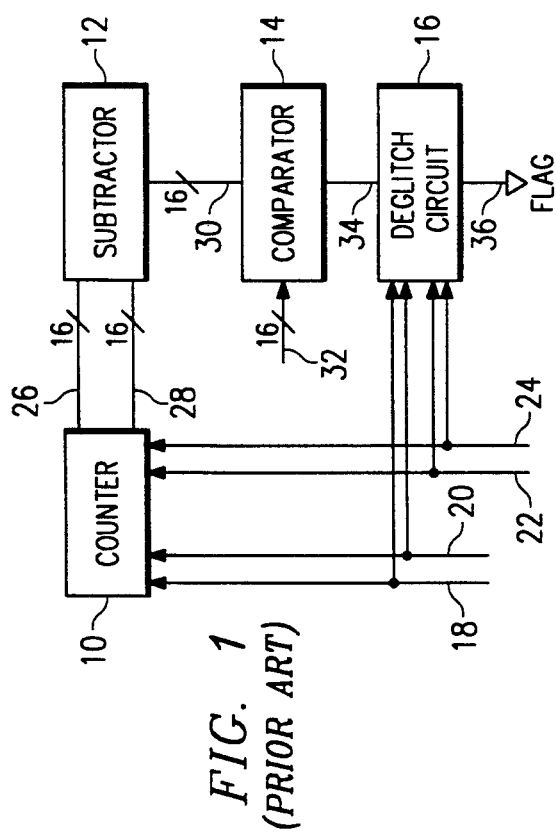
FIG. 4
FIG. 2
(PRIOR ART)

PARALLELIZED MAGNITUDE COMPARATOR FOR COMPARING A BINARY NUMBER TO A FIXED VALUE

CROSS REFERENCE TO RELATED APPLICATIONS

The subject matter of the present application is related to copending U.S. application, Ser. No. 07/860,981, titled "Parallelized Borrow Look Ahead Subtractor" and copending U.S. application, Ser. No. 07/876,959 titled "Parallelized Magnitude Comparator", filed with the Application hereof on Apr. 30, 1992, both assigned to the assignee hereof, and both of which are herein incorporated by reference.

BACKGROUND OF THE INVENTION

1. Field of the Invention

The present invention relates generally to integrated circuits, and more specifically to a magnitude comparator circuit.

2. Description of the Prior Art:

Magnitude comparator circuits are used when it is necessary to determine the relationship between the magnitude of two numbers—whether a number is equal to, less than, or greater than another number in magnitude. Such circuits find a wide variety of uses in the electronics industry. For example, magnitude comparators are used in conjunction with subtractors to generate high speed flag logic for FIFO (First In First Out) memories. Magnitude comparator circuits are also used in arithmetic logic units (ALU's) found in personal computers (PCs) and other computers and by microprocessors for the execution of certain instructions.

Serial magnitude comparators are a common form of comparator circuits in the prior art. They have a number of individual bit comparators that together serially determine the magnitude of a number relative to another number. First, the least significant bits (LSBs) of the two numbers are compared before comparing the next bits, the LSB+1. This process continues serially until the most significant bits (MSBs) have been compared. The serial process can be quite consuming; at least 16 gate delays will be incurred for comparing two 16 bit words.

The bit comparators which comprise a serial magnitude comparator have a total of four inputs: an input equal to a bit from a fixed value, an input equal to a bit from a binary number being compared to the fixed value, an input equal to the complement of the binary number to be compared, and an input from the compare output of the previous bit comparator. The parallel magnitude comparator compares the binary number input to the fixed value input to determine the magnitude of the binary number relative to the magnitude to the fixed value.

The compare output of a bit comparator is input to the subsequent bit comparator and reflects whether the binary value is equal to, less than, or greater than the magnitude of the fixed value. If the fixed value input is greater than the binary value input, then the compare output is a logic high. If, however, the fixed value input is less than or equal to the binary value input, then the compare output is a logic low. This comparison process starts with the least significant bit (LSB) comparator and continues until the most significant bit (MSB) comparator finishes its comparison operation. The bit comparator with the highest order bit of difference determines the state of the final compare output.

The gate delays associated with serial magnitude comparators can have an adverse effect on overall system performance. In FIFO (First In First Out) memory applications, a magnitude comparator is often used in conjunction with a subtractor circuit to generate FIFO flag logic. In magnitude comparators where a binary number is being compared to a fixed value, the fixed value often serves as a programming value for setting the FIFO flag to a certain level. A FIFO flag tells the user how full the FIFO is. Flag logic, which is dependent on the comparator and subtractor, must be generated quickly. If the magnitude comparator is slow, it will have an adverse affect on how quickly flag logic may be generated and overall FIFO performance will suffer. A fundamental way to enhance the speed at which FIFO flag logic is generated is to minimize propagation and gate delays associated with serial magnitude comparators. It would be desirable to accomplish this using current magnitude comparator design.

SUMMARY OF THE INVENTION

A magnitude comparator suitable for use in a FIFO memory is modified to compare the magnitudes between any binary number and a fixed value. Bit comparators are divided into groups which generate compare output signals in parallel to one another, thereby reducing total magnitude comparator delay and resulting in faster operation. These compare output signals are fed into a control element which determines which compare output signal is allowed to pass through as the final compare output signal.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

FIG. 1 is a block diagram of a FIFO flag generation circuit according to the prior art;

FIG. 2 is a schematic diagram of a serial magnitude comparator for comparing a binary number to a fixed value, as utilized in the prior art;

FIG. 4 is a schematic diagram of a tri-stateable gate according to the present invention.

DESCRIPTION OF THE PREFERRED EMBODIMENT

Figure 3:
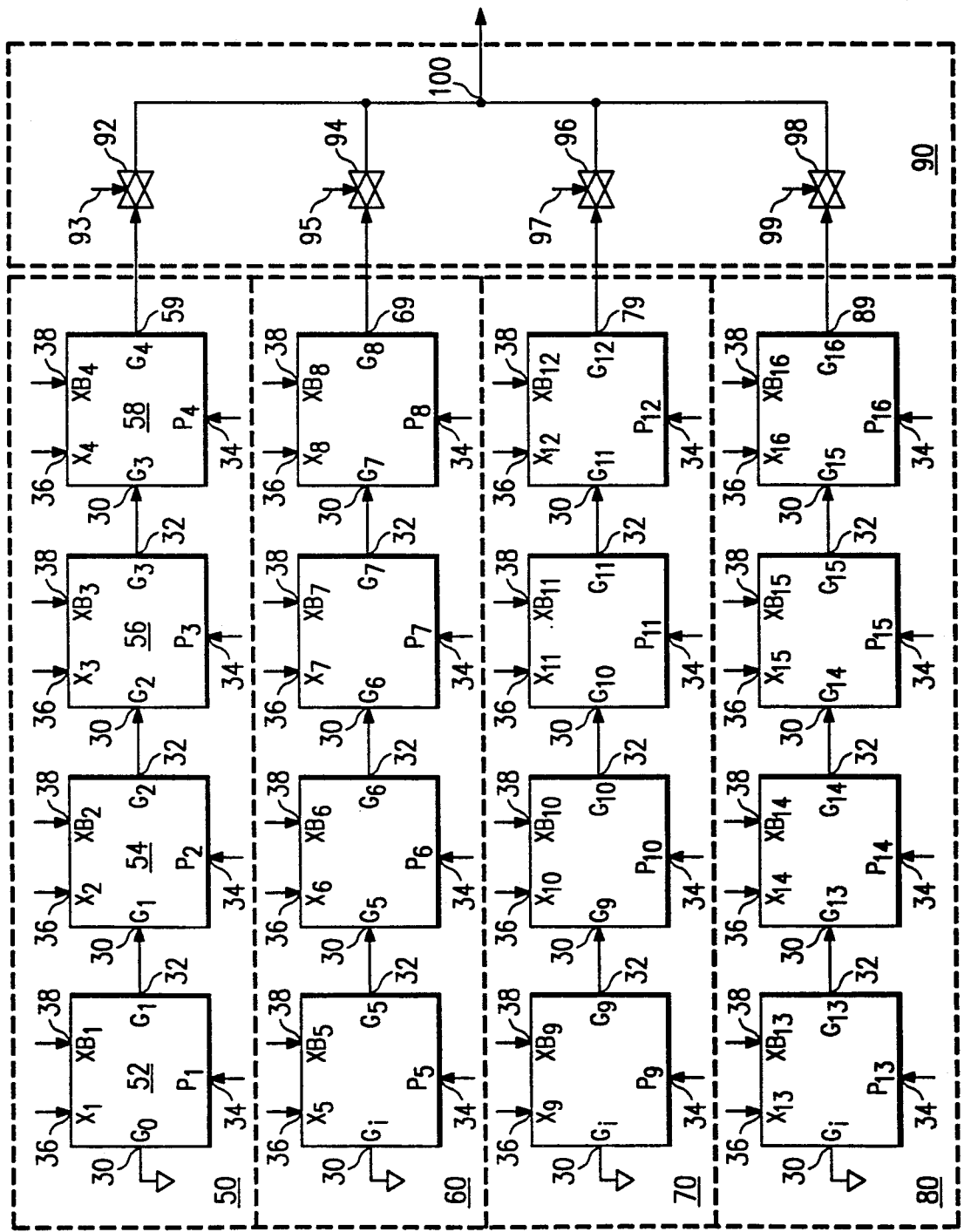
FIG. 3 is a schematic diagram of a parallel magnitude comparator for comparing a binary number to a fixed value, according to the present invention.

A FIFO is a First In First Out memory typically used in applications between machines which use data at different rates of speed: for instance, between a computer and a printer. The FIFO memory outputs its status through the use of a flag. Comparators are frequently used in FIFO memory circuits in conjunction with subtractors to generate FIFO flags. The flag outputs indicate that the FIFO is full, half full, and empty, for instance. In order to determine FIFO status, it is necessary to keep track of how many bits have been written in and how many bits have been read out of the FIFO. Often in FIFO flag logic, the user can set the flag to a fixed program value. It is necessary to know how the magnitude of a binary number compares to the magnitude of a fixed program value. Comparing the magnitude of these numbers is accomplished through the use of a magnitude comparator circuit inside the FIFO.

Referring to FIG. 1, a block diagram of a FIFO Flag generation circuit according to the prior art is shown. The FIFO Flag has a counter block 10, a subtractor block 12, a comparator block 14, and a deglitch block 16. The write clock 18, the read clock 20, the write reset clock 22, and the read reset clock 24 are input signals to both the counter block 10 and the deglitch block 16. The counter block 10 takes these input signals and generates a write count 26 and a read count 28 which are input to the subtractor block 12 which in turn outputs a difference signal 30. This difference signal 30 and a program value 32 are input to the comparator block 14 which compares them in order to generate an output compare signal 34. As is well known in the art, the program value 32 is set to different values depending on the type of flag signal 36, such as empty, half full, or full, to be generated. Finally, the compare signal 34 as well as the write clock 18, the read clock 20, the write reset clock 22, and the read reset clock 24 are input to the deglitch block 36 which generates a flag output signal 36.

FIG. 2 shows a schematic diagram of a serial magnitude comparator 20 utilized in the prior art. The magnitude comparator 20 is responsible for determining the relationship between the magnitude of a fixed value and a binary number. The magnitude comparator 20 has a plurality of bit comparators 22, 24, 26, and 28 which determine the status of the relative magnitude of the binary number to the fixed number. For example, the magnitude status of the binary bit 36 is compared to that of the program bit 34 to determine if the binary bit 36 is equal to, less than, or greater than program bit 34. The number of bit comparators needed is a function of the number of bits in the two numbers being compared.

Every bit comparator 22, 24, 26 and 28 has four inputs and one output. Compare input 30 is the compare output from the previous bit comparator. Program bit 34 represents the fixed program value against which binary bit 36 is compared. Binary bit 36 is inverted to provide binary bit 38. Binary bit 38, which is simply the inverse of input 36, could easily be generated internal to the bit comparator, in which case it would not be an input signal. Program bit 34 is analogous to program value 32 shown in FIG. 1. In both FIG. 1 and FIG. 2, a binary number is being compared to a program value.

The bit comparators of FIG. 2 detect the relative magnitude of the two numbers being compared. Compare output 32, shown in FIG. 2, is determined by comparing binary bit 36 to program bit 34. If program bit 34 is greater than binary bit 36, then compare output 32 is equal to a logic high (1). But, if program bit 34 is less than binary bit 36, then compare output 32 is equal to a logic low (0). However, if program bit 34 is equal to binary bit 36, then compare output 32 is equal to compare input 30. In other words, when program bit 34 and binary bit 36 are equal, compare input 30 is passed though the bit comparator as compare output 32. However, when program bit 34 and binary bit 36 are not equal, program bit 34 is passed through the bit comparator as compare output 32. Compare output 32 is input to the subsequent bit comparator as compare input 30. Table 1 below illustrates under what conditions compare input 30 and program bit 34 are passed through the bit comparator as compare output 32.

TABLE 1

| INPUT 34 | INPUT 36 | OUTPUT 32 |
|---|---|---|
| 0 | 0 | INPUT 30 |
| 0 | 1 | 0 (INPUT 34) |
| 1 | 0 | 0 (INPUT 34) |
| 1 | 1 | INPUT 30 |

As shown in FIG. 2, compare input 30 of the initial bit comparator 22 is tied to a fixed value which can be $V_{cc}$ or ground as shown in FIG. 2. Thus, if program bit 34 and binary bit 36 are the same, then a logic low will be passed out to compare output 32 if compare input 30 is tied to ground. This logic low compare output 32 will be input to the subsequent bit comparator 24. In a sixteen bit example, if all sixteen bits of the binary number are equal to the fixed program value, final compare output 33 of the last bit comparator 28 will also be equal to zero. This process starts with the least significant bit (LSB) comparator 22 and continues serially until the most significant bit (MSB) comparator 28 has finished its compare operation. Only when the magnitudes of the MSBs have been compared will a valid final compare output 33 be generated. The highest order bit comparator with bit difference determines the state of the final compare output 33 of bit comparator 28.

FIG. 2 shows that sixteen bit comparators are needed to compare two sixteen bit numbers. Since the process is serial, it can be quite time consuming to wait for a final compare output. For a sixteen bit comparison, at least sixteen gate delays must be incurred before a final compare output signal is forthcoming. This is applicable even if only the LSBs differ or if all sixteen bits being compared are equal in magnitude. It is desirable to speed up this serial comparison process since many comparator applications demand high speed performance.

FIG. 3 shows a schematic diagram of a parallel magnitude comparator for comparing a binary number to a fixed value, according to the present invention. The bit comparators have the same inputs and outputs as shown in FIG. 2. However, the present invention differs from the prior art in that the bit comparators are segmented into groups which operate independently of each other in parallel. Referring to FIG. 3, the bit comparators are divided into comparator groups 50, 60, 70, and 80. The inputs and outputs of each bit comparator are equal to those shown in FIG. 2. Binary bit 36 is the bit of the binary number being compared to program bit 34 of the fixed program value. Binary bit 38 is the inverse of binary bit 36, and could, therefore, be generated internal to the bit comparator and need not be an input at all. Compare input 30 is equal to compare output 32 from the previous bit comparator. Compare output 32, as shown in FIG. 2, is determined by comparing binary bit 36 to program bit 34. If program bit 34 is greater than binary bit 36, then compare output 32 is equal to a logic high (1). But, if program bit 34 is less than binary bit 36, then compare output 32 is equal to a logic low (0). However, if program bit 34 is equal to binary bit 36, then compare output 32 is equal to compare input 30. The truth table shown above for FIG. 2 is also applicable to FIG. 3.

In a sixteen bit example, comparator group 50 compares the magnitude of the four least significant bits (LSBs) of two numbers. Comparator groups 60 and 70 compare the magnitude of bits 5-8 and 9-12, respectively, while comparator group 80 compares the magnitude of the most significant bits (MSBs), 13-16. Comparison of these bits occurs serially within the comparator groups, with comparator groups 50, 60, 70, and 80 operating in a parallel fashion to one another. Therefore, comparison of all sixteen bits occurs in the same amount of time required to compare four bits in the serial magnitude comparator of FIG. 2. Clearly this means an increase in performance for any system using a parallel magnitude comparator. One skilled in the magnitude comparator art will recognize that breaking the bit comparators into groups of four is only one of many ways to group the bit comparators.

The compare output signals 59, 69, 79, and 89 of each comparator group are inputs to the control element 90. Only one of these compare output signals, selected by control element 90, will be passed through the control element to the final compare output 100. Control element 90 has a plurality of transmission gates 92, 94, 96, and 98 each of which corresponds to one comparator group: 50, 60, 70, and 80, respectively. Each transmission gate has as inputs the compare output from the corresponding comparator group and an logic input determined by boolean equations. Transmission gate 92 has as its inputs compare output 59 of comparator group 50 and logic input 93. The logic inputs 93, 95, 97, and 99 ensure that only the compare output of the comparator group having the highest order bits with magnitude difference will be passed out of control element 90 as final compare output 100. If none of the bits are different, then compare output 59 of the lowest order comparator group 50 is passed through control element 90 as final compare output 100.

Logic inputs 93, 95, 97, and 99 are determined by the following equation: $S_N = X_N + X_{N-1} + X_{N-2} + X_{N-3}$, where $X_N$ is equal to the highest order binary bit being compared in a comparator group and $X_{N-3}$ is equal to the lowest order binary bit being compared in a comparator group. This equation assumes that program bit 34 is equal to a logic low and $X_N$ is equal to the corresponding binary bit 36. If program bit 34 is equal to a logic high, then corresponding binary bit 36 is inverted along with the corresponding $X_N$. Specifically, the logic inputs are as follows:

Input $99 = S_{16} = X_{16} + X_{15} + X_{14} + X_{13}$

Input $97 = S_{12} \cdot \overline{S}_{16} = (X_{12} + X_{11} + X_{10} + X_9) \cdot \overline{S}_{16}$ Input $95 = S_8 \cdot \overline{S}_{12} \cdot \overline{S}_{16} = (X_8 + X_7 + X_6 + X_5) \cdot \overline{S}_{12} \cdot \overline{S}_{16}$ Input $93 = \overline{S}_8 \cdot \overline{S}_{12} \cdot \overline{S}_{16}$ When one of the logic inputs 93, 95, 97, or 99 is high, its corresponding transmission gate allows the corresponding comparator group compare output 59, 69, 79, or 89 to pass through the transmission gate. If, however, the logic input is low, its corresponding transmission gate turns off and does not allow the corresponding compare output signal to pass through the transmission gate. These equations guarantee that the compare output of the comparator group with the highest order of bit difference is passed out as final compare output 100. For instance, if the binary number and the fixed program value have unequal magnitudes for bit 14 and also for bit 2, the logic inputs ensure that compare output 89 of comparator group 80 will be passed out as final compare output 100 since bit 14 is more significant than bit 2. Determination of logic inputs 93, 95, 97, and 99 occurs at the same time comparator groups 50, 60, 70 and 80 perform magnitude compare operations. This parallel operation allows the appropriate compare output 59, 69, 79, or 89 to be selected by control element 90 and passed out as final compare output 100 immediately after the comparator groups have completed comparison operations. Control element 90 adds no delay to the parallel magnitude comparator comparison time, since control element 90 finishes its operations prior to or at the same time group compare outputs 59, 69, 79, and 89 are ready to be passed through the control element 90.

The present invention as described in FIG. 3, would result in 5 gate delays: one gate delay for each magnitude comparator operating serially in a comparator group, such as magnitude comparators 52, 54, 56, and 58 in comparator group 50, and one gate delay for control element 90. The invention requires no buffering since the bit comparators are split into groups of four. This is a marked improvement over the serial magnitude comparator shown in FIG. 2 which results in at least 16 gate delays, one for each bit comparator. In the 16 bit example, buffering is needed to avoid the signal degradation which would occur from propagation through 16 serially connected bit comparators. The gate delay is even greater when buffering is used in the serial magnitude comparator. If an inverter were placed after every fourth bit comparator, four extra gate delays would be added for a total of 20 gate delays.

An alternative embodiment of the invention using a tri-stateable gate rather than a transmission gate is shown in FIG. 4. FIG. 4 shows a tri-stateable gate 110 with three inputs: INPUT, LOGIC INPUT and $\overline{\text{LOGIC INPUT}}$. INPUT is the compare output signal from the corresponding comparator group and is analogous to group compare outputs 59, 69, 79, and 89 shown in FIG. 3. LOGIC INPUT is analogous to logic inputs 93, 95, 97, and 99 of FIG. 3; LOGIC INPUT is determined by the same $S_N$ equations shown above. $\overline{\text{LOGIC INPUT}}$ is simply the inverse of LOGIC INPUT. The OUTPUT signal is determined by the state of the LOGIC INPUT signal. When LOGIC INPUT is a logic high, $\overline{\text{LOGIC INPUT}}$ is a logic low, and the LOGIC INPUT signal is passed through as the OUTPUT. When LOGIC INPUT is a logic low, $\overline{\text{LOGIC INPUT}}$ is a logic high, and tri-stateable gate 110 is effectively in a high impedance state and shuts off, allowing nothing to pass.

Four tri-stateable gates 110 would take the place of the four transmission gates shown in FIG. 3 and would both multiplex and buffer in the same stage. The outputs of these four pass gates would be wired together for a single final compare output 100. In this case, buffering would still not be required for the 16 bit parallel magnitude comparator shown in FIG. 3.

The parallelized magnitude comparator has been described in relation to a FIFO flag generation circuit. The magnitude comparator can also be used in a multitude of other applications such as in arithmetic logic units (ALUs) of computers where it is necessary to determine the magnitude of one number relative to that of a second number.

While the invention has been particularly shown and described with reference to two preferred embodiments, it will be understood by those skilled in the art that various changes in form and detail may be made therein without departing from the spirit and scope of the invention.

What is claimed is:

1. A magnitude comparator, comprising:
    a plurality of bit comparators, divided into comparator groups that each generate a comparator group output signal, wherein each of said bit comparators has a binary bit input signal, a fixed bit input signal, a compare input signal and a compare output signal, and compares the magnitude between the binary bit input signal and the fixed bit input signal and generates the compare output signal, wherein the compare input signal of each bit comparator is the compare output signal generated by the previous bit comparator and wherein the compare output signal of each bit comparator is provided as the compare input signal of the subsequent bit comparator; and
    a control element, having control input signals connected to the comparator group outputs of said comparator groups, which selects one of the comparator group outputs of said comparator groups to be output from said control element.

2. The magnitude comparator of claim 1, wherein each said comparator group is independent from every other comparator group.

3. The comparator group of claim 2, wherein said comparator groups compare a plurality of bits simultaneously.

4. The comparator group of claim 2, wherein said comparator groups and said control element perform their respective functions simultaneously.

5. The magnitude comparator of claim 1, wherein the compare input signal of the initial bit comparator is set to a predetermined level.

6. The magnitude comparator of claim 1, wherein the binary bit input signal is a bit from a binary number and the fixed bit input signal is equal to a bit from a fixed value.

7. The magnitude comparator of claim 1, wherein said control element determines which said comparator group contains the highest order bits which do not match.

8. The control element of claim 7, wherein said control element has a plurality of gates each of which corresponds to one of said comparator groups.

9. The control element of claim 8, wherein said control element has a plurality of transmission gates each of which corresponds to one of said comparator groups.

10. The control element of claim 8, wherein said control element has a plurality of tristateable gates each of which corresponds to one of said comparator groups.

11. The comparator of claim 8, wherein each said gate receives a first and a second value input which determines whether said gate will allow the first value input to be output from said gate.

12. The gate of claim 11, wherein the first value input is the comparator group output from the corresponding said comparator group.

13. The gate of claim 12, wherein the second value input is determined by whether the bits compared in the current said comparator group or higher order said comparator groups match.

14. The gate of claim 11, wherein said gate is capable of not allowing said first value input of said gate to be output from said gate.

15. The gate of claim 11, wherein only one of the plurality of gates may allow said first value input of said gate to be output from said gate.

16. The control element of claim 8, wherein there are four said comparator groups each of which has four bit comparators.

17. The control element of claim 16, wherein each of four said comparator groups corresponds to one said gate for a sixteen bit FIFO flag generation circuit.

18. The magnitude comparator of claim 1, wherein the magnitude comparator is suitable for use in a FIFO flag circuit and the fixed bit input signal is a program bit.

19. The magnitude comparator of claim 6, wherein when the binary input signal is equal to the fixed bit input signal, the compare input signal is passed through the bit comparator as the compare output signal.

20. The magnitude comparator of claim 6, wherein when the binary bit input signal is not equal to the fixed bit input signal, the fixed bit input signal is passed through the bit comparator as the compare output signal.

21. A method for comparing the magnitude between a binary value and a fixed value, comprising the steps of:
    comparing the magnitude between a binary value input and a fixed value input by grouping bit comparators into comparator groups which generate compare outputs which are input to a control element, wherein each bit comparator has a binary bit input signal, a fixed bit input signal, a compare input signal and a compare output signal, and compares the magnitude between the binary bit input signal and the fixed bit input signal and generates the compare output signal, wherein the compare input signal of each bit comparator is the compare output signal generated by the previous bit comparator and wherein the compare output signal of each bit comparator is provided as the compare input signal of the subsequent bit comparator; and
    generating a final compare output from said control element indicative of whether the magnitude of said binary value input is equal to, less than, or greater than the magnitude of said fixed value input.

22. The method of claim 21, wherein said comparator groups, which operate in parallel and independently of each other, generate compare outputs which are input to said control element.

23. The method of claim 21, wherein said control element selects only one of said compare outputs to be output from said control element as a final compare output.

24. The method of claim 21, wherein said comparator groups and said control element operate independently and in parallel with each other.

25. The method of claim 21, wherein comparison of the magnitude between said binary value input and said fixed value input is useful to generate a flag signal suitable for a FIFO.

* * * * *